No. 871,405.
PATENTED NOV. 19, 1907.
H. HERTZBERG & M. J. WOHL.
ELECTRICALLY HEATED SOLDERING IRON.
APPLICATION FILED FEB. 11, 1907.
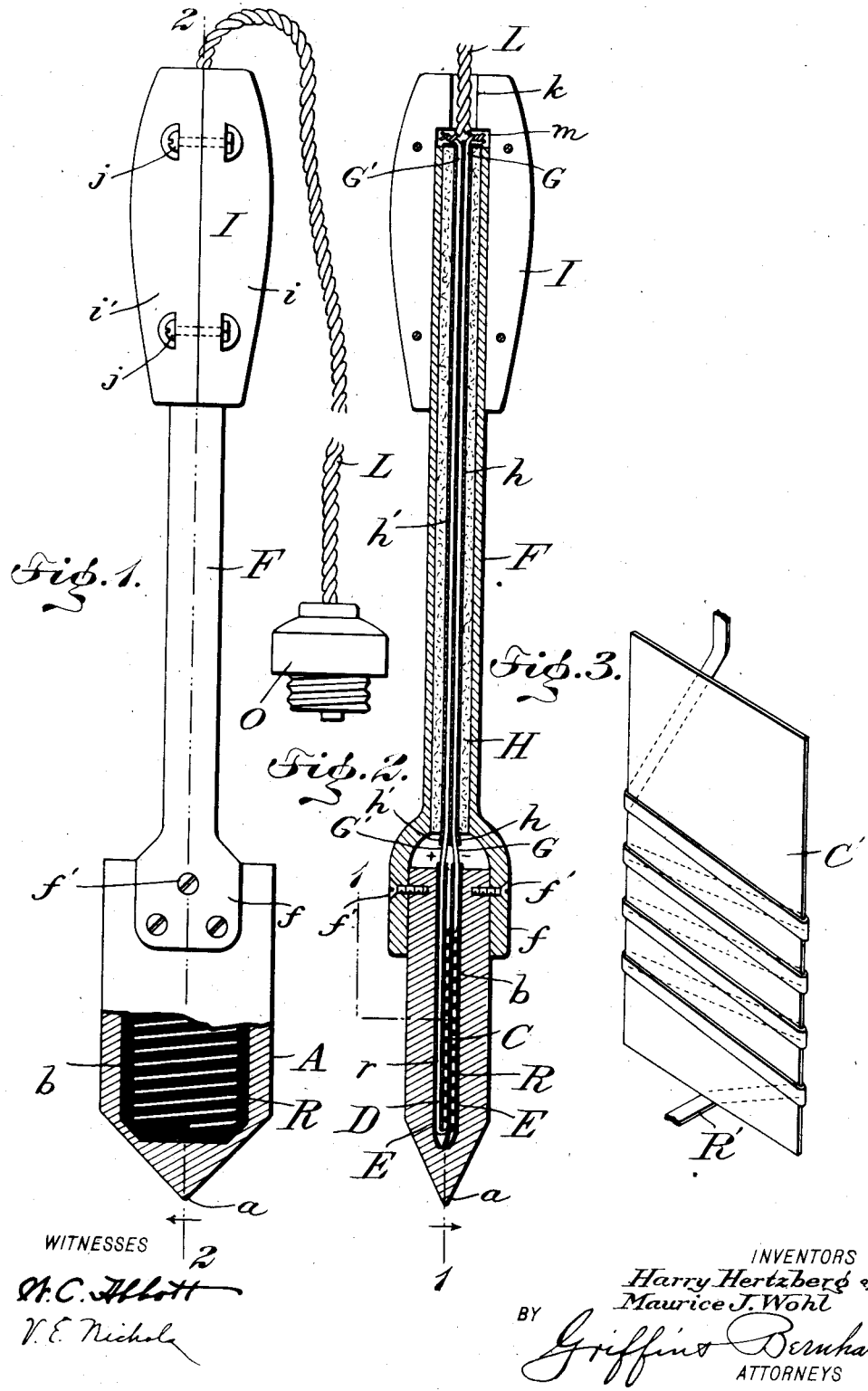

UNITED STATES PATENT OFFICE.

HARRY HERTZBERG AND MAURICE J. WOHL, OF NEW YORK, N. Y., ASSIGNORS TO ABBOT AUGUSTUS LOW, OF HORSESHOE, NEW YORK.

ELECTRICALLY-HEATED SOLDERING-IRON.

No. 871,405.      Specification of Letters Patent.      Patented Nov. 19, 1907.

Application filed February 11, 1907. Serial No. 356,802.

*To all whom it may concern:*

Be it known that we, HARRY HERTZBERG and MAURICE J. WOHL, citizens of the United States, and residents of the city of New York, borough of Brooklyn, in the county of Kings and State of New York, have invented a certain new and useful Electrically-Heated Soldering-Iron, of which the following is a specification.

This invention is a soldering iron to be heated by an electrical current, the object in view being to rapidly heat a mass of metal by a small volume of current, thereby securing economy in the consumption of the electric energy required to keep the device in a heated condition for service.

The soldering iron of this invention is simple, compact and cheap. The parts which are included in the electric circuit are inclosed for the purpose of obviating injury thereto in using the device, and said parts are insulated electrically to minimize the danger of short circuiting the current, thus enabling the soldering iron to be handled and used with safety by inexperienced operators. The shank and handle portion of the device are constructed to obviate loss of heat by radiation and to prevent said handle from becoming heated to such an extent as will char or burn it or interfere with the operator in using the iron.

Various other advantages of the invention will appear in the course of a detailed description of one embodiment thereof.

In the accompanying drawings, we have illustrated cne practical embodiment of the invention, but the construction shown therein is to be understood as illustrative only, and not as defining the limits of the invention.

Figure 1 is an elevation, partially broken away and in section, of a soldering iron constructed in accordance with this invention, the plane of the section being indicated by the dotted line 1—1 of Fig. 2. Fig. 2 is a longitudinal section on the line 2—2 of Fig. 1. Fig. 3 is a detail perspective view illustrating another form of electrical resistance which is wound or coiled on a core of insulating material.

A designates a body or mass of metal which may be of any suitable nature, although we have found copper to be suitable for the purpose because of its high heat conductive properties. The body or mass A may consist of one or a plurality of pieces, but as shown, the body or mass is a single piece. As shown, the body or mass A is pointed at one end by beveling the respective sides thereof on converging lines so as to meet in the nose or point $a$, this form of the body being found preferable in the actual work or service of the iron, although it will be understood that we do not intend to limit ourselves to any shape or size of the body or mass A, nor in fact, of the complete implement. The body or mass A is provided, furthermore, with a chamber, cavity or recess $b$, which is adapted to receive an electrical resistance, the latter being indicated by the letter R in the drawing.

Various forms of the electrical resistance may be employed, such for example, as a block, strip or length of molded carbon, or a thin metallic wire, or a metallic ribbon, and in the drawings we have shown the thin metallic wire in Figs. 1 & 2, while Fig. 3 represents a metallic ribbon.

When a metallic resistance is employed, we prefer to wind or coil it on a core of suitable insulating material. This core may, and preferably does, consist of a strip or layer of mica indicated by C. It should be understood that the resistance R is coiled or wrapped the desired number of times around the layer of insulating material C, and that one end $r$ of this resistance wire or ribbon is carried or led lengthwise of the core C. In Fig. 3 the resistance is shown as a flat metallic ribbon R', which is coiled or wrapped on the flat layer C' of insulating material. After winding the resistance wire or ribbon on the core C we arrange another layer D of resistance material between the winding of the wire and the return end $r$ of said wire or ribbon, and the layers C D of insulating material and the resistance wire or ribbon are furthermore inclosed between other insulating layers E E', which are also composed of thin sheets of mica.

It will be seen that we build up the electrical resistance and layers of insulating material in an extremely compact manner, so that said parts may be inclosed within the body or mass of metal A without increasing the size of said body or mass for the accommodation of the means employed by us for electrically heating the soldering iron to the temperature necessary for effective service.

An important feature of the invention consists in arranging the electrical resistance practically in contact with the mass or body of metal, and at the same time insulating the resistance electrically from such direct contact, whereby the heat developed by charging the resistance with an electrical current will be absorbed by the body or mass of metal as fast as it is generated. We accomplish these two objects by employing a resistance, such as R or R', which is separated from the body or mass of metal by extremely thin layers of mica, so that the heat of the resistance is given off or imparted directly to the mass of metal. In our invention the layers E E' of mica are extremely thin so that they will serve to permit the free and practically unobstructed passage of the heat from the resistance to the body or mass of metal, while at the same time said mica layers serve to electrically insulate the resistance from contact with the body or mass A, thus obviating the formation of a short circuit.

From the foregoing description it will be noted that we employ a thin core composed of a single layer of mica; that we wind a thin metallic wire or ribbon on said core so as to produce a flattened winding, the convolutions of which winding on the opposite sides of the core are insulated electrically by said core, and that the winding of the resistance is insulated electrically from the mass of metal by other thin layers of mica. The flattened winding of resistance wire or ribbon presents an extended surface for contact mechanically with the mass of metal, for the reason that each face of each convolution is adapted, practically, for such contact with the mass of metal, within which mass the resistance is inclosed. The mica core and the layers of mica insulations are so thin that they offer practically no obstruction to the transmission of heat from the resistance to the metallic mass, although said mica is efficient in electrically insulating the resistance from the mass of metal. Our electrically operated heater is exceedingly compact in construction, and its use within the body of a soldering iron does not require or necessitate any increase in the size of said body in excess of standard sizes of commercial soldering irons now on the market.

Various mechanical constructions adapted for the purpose of manipulating the iron may be resorted to in connection with the body or mass A and the electrical resistance therein. As shown, we employ a hollow shank F which is in the form of a tube that is split or bifurcated to produce the ears $f$, the latter being adapted to overlap the respective sides of the body or mass A, whereby the shank and said body or mass may be united rigidly by suitable fastenings, such as screws $f'$.

Within the hollow shank are leading wires or conductors G G' which are attached to the respective ends of the electrical resistance R or R'. As shown, we prefer to incase these leading wires by a tubular casing $h$ $h'$, and these leading wires with the casings are housed within a hollow lining H. The casings $h$ $h'$ and the lining H are composed of a suitable heat non-conducting material, such for example as asbestos. The lining H is preferably tubular, and it extends substantially the full length of the shank. The casings $h$ $h'$ inclose the leading wires G G' practically from the body or mass of metal A to the end of the shank, whereby the leading wires are thoroughly protected in such a way as to prevent the radiation of heat to the shank F.

The shank is equipped with a handle I which may be composed of a suitable nonconductor. As shown, the handle is divided lengthwise to produce complemental sections $i$ $i'$, which are adapted to be drawn together by suitable screws $j$, whereby the handle may be clamped upon the end portion of the hollow shank F. Said handle is provided with an opening $k$ at one end, and with a chamber $m$, into which chamber extends the end portion of the leading wires G G'.

A conductor L is twisted to the leading wires G G' within the chamber $m$, thus providing an anchorage for the aforesaid conductor L. This conductor may be supplied with a current from any suitable source of power, but as shown it is equipped with a socket connection O.

The operation of the invention will be readily understood by those skilled in the art from the foregoing description taken in connection with the drawing. The connection O is adapted to be screwed into a socket for the purpose of supplying a current to the leading wires G G' and the resistance R. The heat developed by the resistance is transmitted through the mica layers E E' directly to the respective side portions of the body or mass of metal A, the latter operating to absorb the heat directly from the said resistance.

In one embodiment of the invention we have found it advisable to employ an extremely thin wire or attenuated conductor as a resistance, and in some of our experiments we have demonstrated that by inclosing the resistance within and in practically direct contact with the body or mass of metal, said resistance is prevented from heating to such a degree as to become red hot. This is owing to the fact that the heat developed by the resistance is transmitted to and absorbed by the body or mass of metal as rapidly as the heat is developed in the resistance.

A soldering iron constructed in accordance with our invention may be heated quickly owing to the intimate relationship between the resistance and the body or mass of metal, and we find from actual experience that the iron not only heats up very quickly, but it consumes a relatively small quantity of current which renders the iron serviceable for the performance of its work.

Having thus fully described the invention, what we claim as new, and desire to secure by Letters Patent is:

1. In a device of the class described, an external body or mass of heat-absorbing metal, a flat core therein, and a bare metal resistance wire or ribbon coiled in a single layer or winding on said core and inclosed within said body or mass of metal, said wire or ribbon being in mechanical contact throughout its length with said mass of heat-absorbing metal and insulated electrically therefrom, whereby the heat developed in said resistance is absorbed directly by the mass of metal.

2. In a device of the class described, an external hollow body or mass of heat-absorbing metal, a core of insulating material therein, a bare metal resistance wire or ribbon coiled in a single layer or winding on said core and inclosed therewith inside of said body or mass of metal, said resistance wire or ribbon being in mechanical contact throughout its length and on its respective sides with the body or mass of heat-absorbing metal, and thin layers of heat transmitting and electrical insulating material between said wire or ribbon and the aforesaid mass of metal within which the wire or ribbon is inclosed.

3. In a device of the class described, an external hollow body or mass of heat-absorbing metal, a thin flat core of insulating material, and an electrical resistance wire or ribbon wrapped on said core and inclosed therewith within said body or mass of metal, said wire or ribbon being in mechanical contact throughout its length with said body or mass of heat-absorbing metal.

4. In a device of the class described, an external hollow body or mass of heat-absorbing metal, an electrical resistance inclosed within said body or mass of metal and in mechanical contact therewith throughout the length of said resistance, and thin layers of mica intermediate of the resistance and said metallic mass, said mica layers being in direct contact with the respective sides of said electrical resistance and with said mass of heat-absorbing metal.

5. In a device of the class described, a metallic resistance, an external hollow body or mass of heat-absorbing metal inclosing said metallic resistance and in close mechanical contact therewith, and thin layers of interposed electrical insulating material in direct contact with said resistance and with said mass or body of metal.

6. In a device of the class described, an external body or mass of heat-absorbing metal, a thin flat layer of mica forming a core of non-conducting material, a bare metal resistance wire or ribbon wrapped in a single layer or winding on the core and inclosed within the body or mass of heat-absorbing metal, and thin layers of mica forming electrical insulations between, and in direct contact with, both the resistance wire or ribbon and said body or mass of heat-absorbing metal.

7. In a device of the class described, a body or mass of heat-absorbing metal, an electrical resistance therein, a hollow shank fastened to said body or mass, suitable conductors in the shank, and a divided handle made separate from the shank and comprising members which are clamped detachably on said shank.

8. In a device of the class described, a body or mass of metal, an electrical resistance therein, a hollow shank, leading wires inclosed by the shank and connected with said resistance, a handle attached to said shank and provided with an anchor chamber at one end of the shank, and conductors anchored in said chamber of the handle and connected to the leading wires within said shank.

In testimony whereof we have signed our names to this specification, in the presence of two subscribing witnesses.

HARRY HERTZBERG.
MAURICE J. WOHL.

Witnesses:
Jas. H. Griffin,
H. I. Bernhard.